Feb. 15, 1949.  F. R. ALLIN ET AL  2,461,712
TRAILER HAND CONTROL FOR POWER BRAKES
Filed Nov. 18, 1947   3 Sheets-Sheet 1

INVENTORS.
FREDERICK R. ALLIN
& FREDRIC D. WYSS.
BY Richey + Watts
ATTORNEYS.

INVENTORS.
FREDERICK R. ALLIN
& FREDERIC D. WYSS.
BY Richey & Watts
ATTORNEYS.

INVENTORS.
FREDERICK R. ALLIN
& FREDERIC D. WYSS.
BY
ATTORNEYS.

UNITED STATES PATENT OFFICE 2,461,712

TRAILER HAND CONTROL FOR POWER BRAKES

Frederick R. Allin, Euclid, and Frederic D. Wyss, Cleveland Heights, Ohio, assignors to The Weatherhead Company, Cleveland, Ohio, a corporation of Ohio Application November 18, 1947, Serial No. 786,776

8 Claims. (Cl. 303—54)

This invention relates to a manually controlled valve for the independent actuation of trailer brakes in a tractor and trailer brake system.

It is well-known that modern heavy-duty transportation trucks generally include two units—a tractor unit and a trailer unit. The tractor unit usually employs hydraulic brakes controlled by a pedal which operates the master cylinder. There may be included a servo mechanism for the hydraulic brakes in the form of a vacuum booster cylinder which operates a hydraulic slave cylinder connected to the hydraulic tractor brake cylinders, under control of pressure developed in the pedal-operated master cylinder. Generally speaking, the trailer brakes are mechanical brakes actuated by pneumatic cylinders. For safety reasons it is often desirable to apply the trailer brakes independently of the tractor brakes to prevent telescoping, etc., and the problem arises of operating both types of brakes from the cab of the tractor, as well as providing for independent operation of the trailer brakes.

The hand control valve of this invention makes it possible to independently apply the trailer brakes regardless of the manipulation of the standard brake pedal.

It is a feature of the present invention that by means of a manually controlled valve (preferably conveniently located for hand control by the driver of the tractor) a regulated pressure is provided that is a function of the displacement of the control handle from the brake released position, which provides a precise control over the trailer brakes.

It is another feature of this invention that the operator of the hand control valve has a sensation of control or "feel" as he operates the valve, even though there are no mechanical response connections from the brakes to the valve and even though no pressure lines from the brake actuators to the valve serve as response or "feel" sensing lines. With the hand control valve of the present invention, as the hand lever is depressed to apply the brakes, a follow-up regulating mechanism in the valve comes into action to alter pressure in the trailer brake control line. This, in turn, causes the trailer brakes to be applied and simultaneously imposes a force tending to restore the handle proportional to the amount of brake application. Accordingly, if the operator wishes to apply the brakes more fully he is forced to exert more pressure on the handle which duplicates the "feel" of a brake control that is directly connected to the brakes. The manner in which these advantages are attained in a preferred form of control valve will be explained in detail in the following description of a preferred embodiment.

Another advantage of applicant's control valve results from the mounting of the two valve members employed so that their relative positions may be adjusted without affecting the position of the diaphragm and hence the calibration of the valve, this adjustment being accessible and open to the atmosphere.

Figure 1:
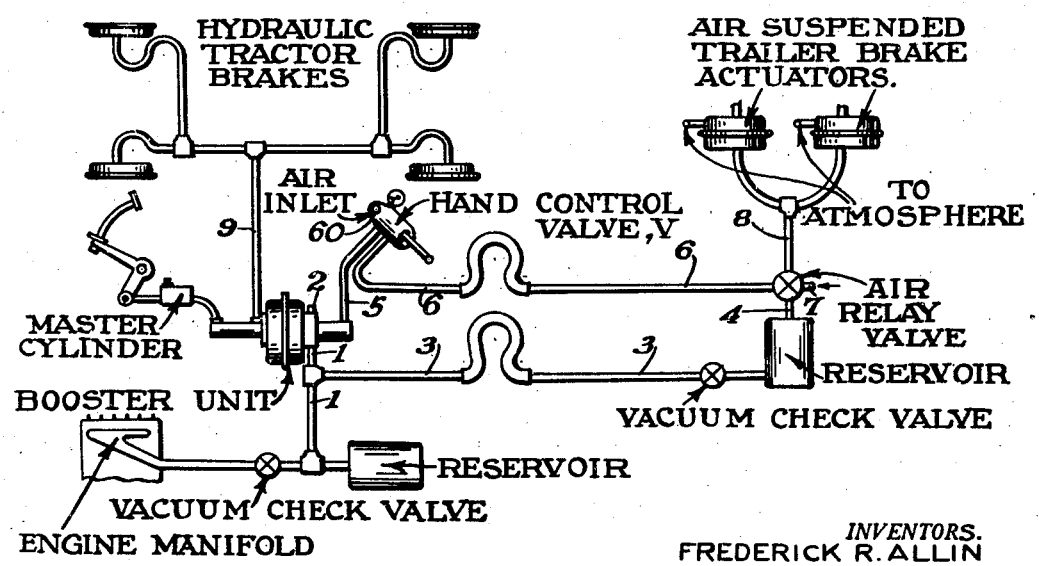
Fig. 1 is a schematic diagram illustrating a typical application of the invention to a system employing air suspended brakes.

The diagram in Fig. 1 illustrates a typical application of the hand control valve to an air suspended trailer brake system but is not intended to limit the use of the valve in any way.

A hydraulic line leads from the pedal-operated master cylinder to the hydraulic section of a brake booster unit and another hydraulic line 9 leads from the hydraulic section of the booster unit to the hydraulic tractor brakes. The exact internal arrangement of the booster unit is not critical to the invention and numerous designs which will operate in the system illustrated in Fig. 1 are known to those skilled in the art. The pneumatic section of the booster unit is connected to the engine manifold which provides a source of vacuum by means of a vacuum line I. The booster unit has two functions, both regulated in accordance with pedal position. The unit acts as a servo cylinder for the hydraulic tractor brakes and as an air pressure regulator for control of the trailer brakes. A vacuum line 3 branches from line I and passing through a vacuum check valve, connects to a reservoir tank for the trailer brakes, the check valve being employed in the vacuum line to permit operation in case the engine is stalled. The trailer brake reservoir tank connects to an air relay valve by means of line 4, such valves being well-known to those skilled in the art. A line 5 leads from the booster unit to the hand control valve V, and line 6 leads from the hand control valve to the air relay valve which valve has a port 7 open to atmosphere. A line 8 leads from the air relay valve to the air suspended trailer brake actuators.

When the brakes are released in the system illustrated, lines 4 and 6 are at full vacuum and the pressures in those lines are equal. Under these conditions, the air relay valve connects atmospheric port 7 to line 8 so that both sides of the air suspended trailer actuator cylinders are open to atmosphere and the trailer brakes are free. However, when the tractor operator depresses the brake pedal, a hydraulically operated valve in the booster unit causes the vacuum to operate a hydraulic servo piston and apply the hydraulic brakes through line 9. At the same time a quantity of air is admitted through an atmospheric port 2 in the booster unit, the quantity depending upon the amount of pedal depression. The passageway through the hand control valve V is normally open and the atmospheric inlet 60 to the valve is closed, and unless the control handle of the valve is actuated, the main control valve presents a through sealed passageway connecting lines 5 and 6. Therefore, the increase in pressure in line 5 due to actuation of the pedal and admission of air in the inlet 2 is transmitted by means of line 6 to the air relay valve. This creates a pressure differential between lines 4 and 5 with which the air inlet 7 is closed off and the vacuum line 4 is placed in communication with the line 8 leading to the trailer brake actuators. Generally, the air relay valve has a regulating action, that is, the amount by which it opens is a function of the amount of unbalance.

Turning now to the general function of the hand control valve V inserted between lines 5 and 6, it is to be noted that this valve also has an air inlet 60 which is normally sealed from the vacuum lines by a valve 52. Assuming that the pedal is not depressed, the hand control valve is so designed that when the actuator is operated (usually by the driver of the cab) a regulated quantity of air that is a function of displacement of the valve handle is bled into the line 6. The resultant pressure differential between lines 4 and 6 operates the relay valve to connect lines 4 and 8 and so apply the trailer brakes independently of the hydraulic tractor brakes. This provides the desired independent control over the trailer brakes and at the same time permits the tractor brakes and trailer brakes to be operated simultaneously from the pedal. It is an important feature of the invention that even though there is no mechanical connection between the control valve and the brake system, a response is provided so that the operator "feels" the application of the brakes in terms of a reaction against the control handle, with the amount of brake action regulated so as to be a function of control handle pressure. Regardless of the amount of pedal pressure applied to operate the tractor brakes, the trailer brakes may be applied fully.

Although the hand control valve is shown in an air suspended vacuum system, it is capable of use in a system wherein a source of pressure is substituted for the source of vacuum. The hand control valve may also be used in systems wherein the trailer brakes are vacuum suspended. It is likewise understood that the operation hand control valve is independent of the nature of the tractor and trailer brakes whether they be hydraulic or mechanical.

Figure 6:
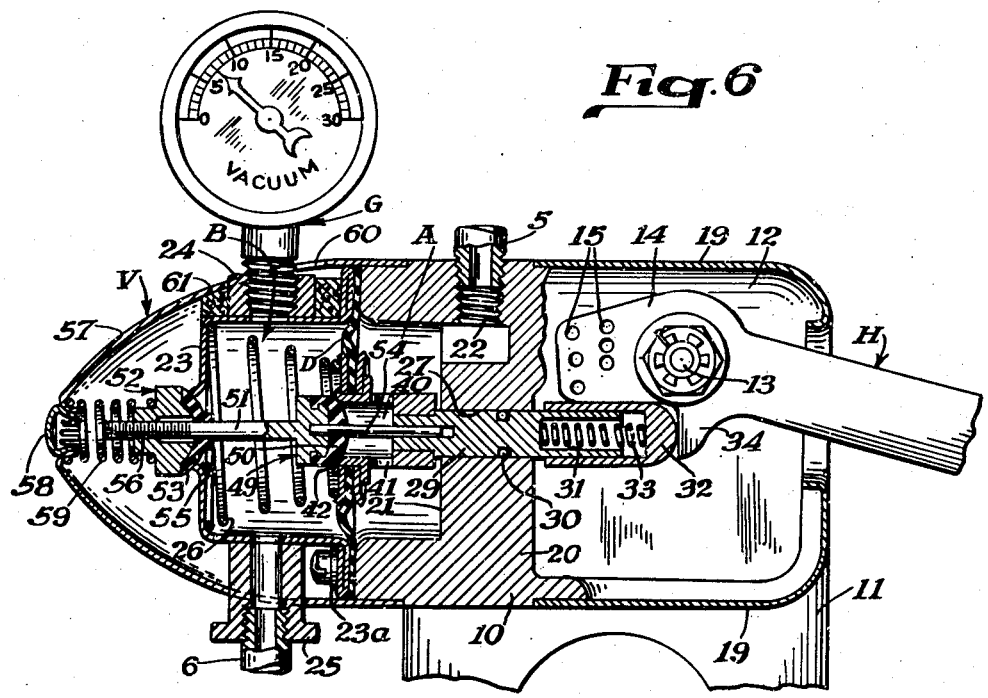
Figs. 4 to 6 are longitudinal sections illustrating various steps in the operation of the valve.
Figure 2:
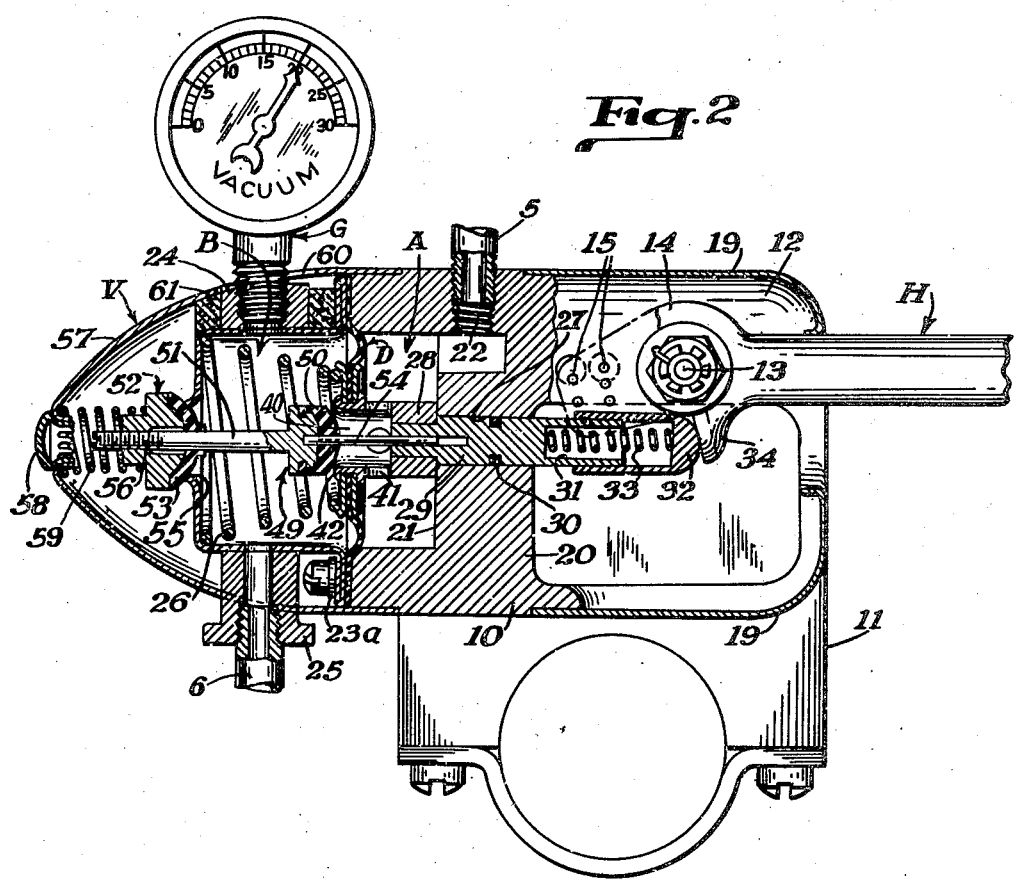
Fig. 2 is a partial longitudinal section through the control valve.
Figure 3:
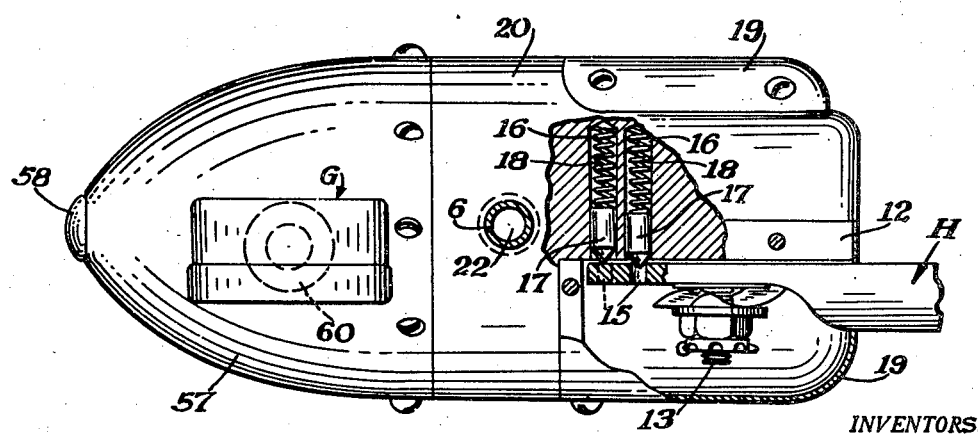
Fig. 3 is a plan view of the valve with parts broken away to illustrate the detent mechanism.
Figure 4:
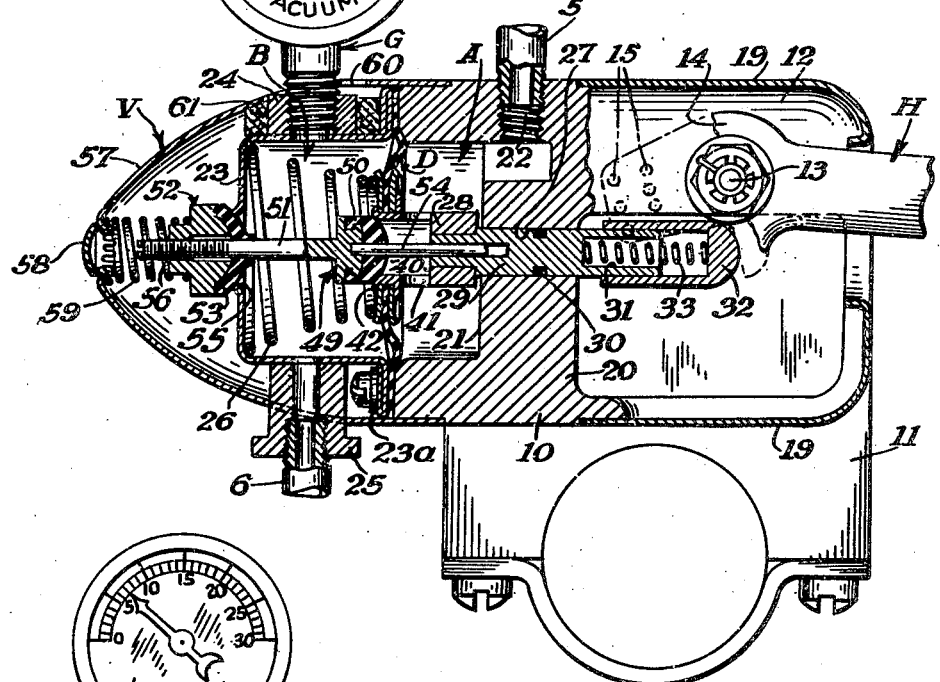
Figure 5:
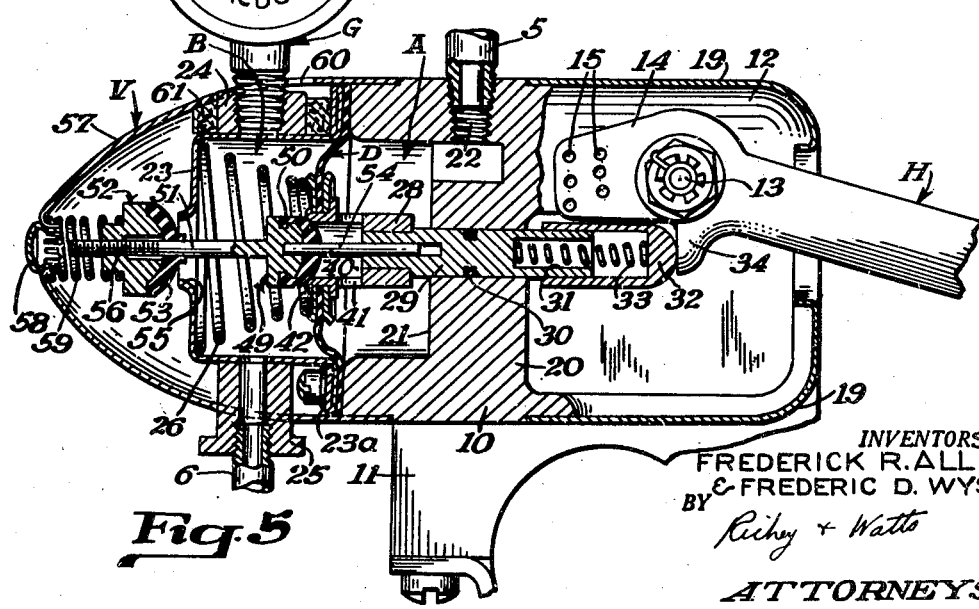

Constructional details of a preferred form of the hand control valve with the valve in the "brake released" position appear in Figs. 2 and 3. Figs. 4 to 6 illustrate various steps in the operation of the valve. The valve includes a body casting 10 which acts as a supporting framework and may be provided with clamp or mounting bracket 11 so that the valve may be mounted on the steering column of a tractor. Body 10 includes a flange section 12 upon which the control handle H is pivoted by means of bolt member 13. The handle has an ear 14 which is provided with a series of detent apertures 15.

As best seen in Fig. 3, a pair of bores 16 are formed in section 12 of body 10, which bores carry detent pins 17 spring pressed against the handle by means of springs 18. The two rows of apertures 15 are staggered to provide the desired degree of angular displacement of the handle between its adjacent latched positions. A cover member 19 is apertured to accommodate the projecting handle and the cover encloses the associated valve parts. Valve body 10 has a wall portion 20 counterbored as at 21, there being a port 22 communicating with the counterbore. Port 22 is connected to the vacuum source such as line 5 in the application illustrated in Fig. 1. Wall 20 has a through bore 27 to accommodate a manually controlled valve operating assembly.

The valve operating assembly includes two relatively movable operator parts that are resiliently coupled. One of these parts includes a stem 29 that passes through bore 27 and is sealed therewith by means of an O-ring 30. A valve seat member 28 is pressed or otherwise attached to stem 29 and is also clamped to the regulating diaphragm D. The other end of the stem 29 is counterbored as at 31 and telescopes within the other part of the valve operating assembly, namely, plunger 32. A spring 33 tends to separate the plunger and stem and provides the resilient coupling between the two operator parts of the assembly. In order to actuate the operator assembly, a lug 34 is formed on the handle H and acts against the rounded nose of plunger 32.

Diaphragm D and counterbore 21 in the valve body cooperate to form the chamber A which is connected to the vacuum source by means of nipple 22. A second or control chamber B is formed by member 23 which has a peripheral flange portion 23a clamped against the diaphragm D and fastened to the body 10 by means of suitable screws or fasteners. In chamber B, nipple 24 may be brazed to member 23 to provide for connection of a pressure gauge G. Control chamber B is also provided with nipple 25 which connects to the control line for the brakes, line 6 in Fig. 1.

A first port 40 is formed at the diaphragm to establish communication between chambers A and B. Port 40 is formed as a counterbore in stem member 28 to be engaged by a vacuum valve member 49 which is provided with a rounded rubber seat portion 50 supported on a stem 51. A second port is provided in member 23 to act as an air inlet port. This is normally closed by valve member 52. Stem 51 is threaded into an air inlet valve member 52 as at 56, valve 52 having a rounded rubber seat 53. The valve member 49 is also guided by means of a pin 54 projecting into a counterbore formed in the stem 29.

A spring 26 urges the diaphragm D in such a direction as to normally maintain port 40 open and so maintain communication between vacuum chamber A and the control chamber B. Spring 59 engages the cap 57 and the air inlet valve 52 so that the valve seat 55 is normally closed unless opened by manual operation of the valve stem 29.

A plug 58 is snapped in place to seal the air inlet chamber and insures that all the air inlet passes through air filter 61. Plug 56 also permits adjustment of valve 52 by means of threaded stem 51.

In operation, with the handle in the "brake released" position shown in Fig. 2, force of spring 26 is adequate to move stem 29 to the right until member 28 strikes the wall 20 and port 40 is open. This establishes communication between chambers A and B. Likewise, spring 59 urges valve 52 in a direction to close off the air inlet port 55, but stem 51 is adjusted so that valve 49 does not engage diaphragm seat 42. Under these conditions the valve chambers A and B are sealed from the atmosphere and the valve provides direct through communication between lines 5 and 6 so that a vacuum is applied to the brake control, which is the air relay valve in the application illustrated in Fig. 1. To apply the trailer brakes independently of the tractor brakes, the handle H is moved down by the operator and lug 34 on the handle presses against plunger 32 and, by compressing spring 33, moves the stem 29 to the left in the drawings. The two parts 29 and 32 of the operator assembly are telescoped somewhat in this operation but spring 33 overcomes the force of diaphragm spring 26 so that the diaphragm D moves to the left until valve seat 42 engages the vacuum valve 49. This condition is illustrated in Fig. 4 where it will be noted that communication between the chambers A and B has now been shut off but air valve 52 has not yet been unseated. As seen in Fig. 5, further depression of the handle moves valve 49, which is fastened to stem 51 and unseats the air valve 52 adjustably mounted thereon by an amount depending upon the position of the handle. In Fig. 5 the brakes are shown almost full on with the vacuum reduced to about 7 inches of mercury. At this point the regulatory action of the valve begins to maintain the selected vacuum. When valve 52 is unseated and with vacuum valve 50 seated against the diaphragm atmospheric air enters chamber B causing a pressure increase in that chamber. In the application illustrated, the increase in pressure chamber B is transmitted by means of line 6 to the air relay valve so that the pressure on the valve is unbalanced and line 4 from the vacuum tank is placed in communication with the line 8 to the trailer brake actuators. The relay valve is preferably a regulating type valve so that the amount of vacuum transmitted to the actuator is a function of the change of pressure in line 6 leading to the valve.

In the hand control valve, as soon as pressure increases in chamber B the diaphragm D is urged to the right and, as shown in Fig. 6, if the handle H is held in the position which it previously occupied, as diaphragm D moves to the right it further compresses the plunger spring 33. With the handle held, this action continues until the air valve 52 just seats at 55 after which no air can enter chamber B and there can be no further increase in pressure in chamber B except for the normal regulatory fluctuation. Of course, the action shown in Fig. 6 occurs as the brakes are applied, and when the operator feels this additional compression of spring 33 he regards it as an indication that the brakes are applied so that if he wishes to maintain the brakes in the applied position he must maintain a certain pressure upon the handle H. Also, if he wishes to further apply the brakes he knows that he must press harder on handle H. This provides a response or "feel" which assists the operator in precisely controlling the brakes even though there is no direct mechanical connection between the brakes and the valve and no response line from the actuators to the control valve. With the handle held in the "brakes applied" position (as shown in Fig. 6) pressure in line 6 is automatically regulated and maintained at a value corresponding to the handle position. For example, in Fig. 6 if the pressure in chamber B increases spontaneously for any reason other than the motion of the handle H, diaphragm D will be moved still further to the right and chambers A and B will again be placed in communication. With this, due to the vacuum connection 22, pressure in chamber B is reduced until it is restored to the selected value determined by the position of the control handle. Furthermore, if there is any decrease in pressure in chamber A from the selected pressure, diaphragm D moves to the left, re-opening valve 52 and admitting atmosphere to chamber B. Thus, the valve acts as a regulator for any position of the handle in addition to providing a feel or response which indicates to the operator that his handle motion has caused pressure changes in the system that actuate the trailer brakes.

Of course, the control valve will operate under other conditions than where the chambers are under a vacuum. For example atmosphere may be open to port 22 and port 25 be connected to brake mechanism or to the relay valve as before, but a positive pressure supplied for port 55. The basic requirement is that there be two different sources of pressure with the lowest source connected to port 22. Regardless of the relation of such pressure sources to atmosphere the described mode of operation will be present and a "feel" will be produced at the control handle.

Although the hand control valve is shown connected to an air suspended system employing a relay valve, it is further understood that the hand control valve could be connected directly in a vacuum line leading to one end of a vacuum suspended brake actuator without altering its mode of operation.

Although the foregoing description is necessarily of a detailed character, in order that the invention may be completely set forth, it is to be understood that the specific terminology is not intended to be restrictive or confining, and that various rearrangements of parts and modifications of details may be resorted to without departing from the scope or spirit of the invention as herein claimed.

What is claimed is:

1. For use in a fluid pressure operated brake system comprising fluid pressure brake actuating means and two different sources of pressure, an independent manually operated valve for connection between the source of lower pressure and the brake actuating means, said manual control valve including a first chamber for connection to said lower pressure source, a second chamber for connection to said brake actuating means, there being a regulating diaphragm between said chambers, a normally open first valved port in said diaphragm for establishing communication between said chambers, a normally closed second valved port in said second chamber for opening said second chamber to the higher pressure source, and operator means associated with said diaphragm positionable for closing said first valved port and opening the second one, said operator means having a diaphragm operating part resiliently coupled to a manually operated part so that when said manually operated part is positioned to close said first valved port, fluid pressure in the second chamber may move said diaphragm toward the position wherein said first valved port is open by deforming the resilient coupling between said operator parts.

2. For use in a fluid pressure operated brake system comprising fluid pressure brake actuating means and a source of vacuum, an independent manually operated valve for connection between said vacuum source and the brake actuating means, said manual control valve including a first chamber for connection to said vacuum source, a second chamber for connection to said brake actuating means, there being a regulating diaphragm between said chambers, a normally open first valved port in said diaphragm for establishing communication between said chambers, a normally closed second valved port in said second chamber for opening said second chamber to atmosphere, and operator means associated with said diaphragm positionable for closing said first valved port and opening the second one, said operator means having a diaphragm operating part resiliently coupled to a manually operated part so that when said manually operated part is positioned to close said first valved port, fluid pressure in the second chamber may move said diaphragm toward the position wherein said first valved port is open by deforming the resilient coupling between said operator parts.

3. For use in a fluid pressure operated brake system comprising fluid pressure brake actuating means and two different sources of pressure, an independent manually operated valve for connection between the source of lower pressure and the brake actuating means, said manual control valve including a first chamber for connection to said lower pressure source, a second chamber for connection to said brake actuating means, there being a regulating diaphragm between said chambers, a normally open first valved port in said diaphragm for establishing communication between said chambers, a normally closed second valved port in said second chamber for opening said second chamber the higher source of pressure, and operator means extending through a wall of said chamber positionable for closing said first valved port and opening the second one, said operator means having a first part connected to said diaphragm and a manually operated part resiliently coupled to said first part so that when said manually operated part is positioned to close said first port and open the second port fluid pressure in the second chamber may move said diaphragm toward the position wherein said first valved port is open by deforming the resilient coupling between said operator parts.

4. For use in a fluid pressure operated brake system comprising fluid pressure brake actuating means and a source of vacuum, an independent manually operated valve for connection between said vacuum source and the brake actuating means, said manual control valve including a first chamber for connection to said vacuum source, a second chamber for connection to said brake actuating means, there being a regulating diaphragm between said chambers, a normally open first valved port in said diaphragm for establishing communication between said chambers, a normally closed second valved port in said second chamber for opening said second chamber to atmosphere, and operator means extending through a wall of said chamber positionable for closing said first valved port and opening the second one, said operator means having a first part connected to said diaphragm and a manually operated part resiliently coupled to said first part so that when said manually operated part is positioned to close said first valved port fluid pressure in the second chamber may move said diaphragm toward the position wherein said first valved port is open by deforming the resilient coupling between said operator parts.

5. For use in fluid pressure operated brake system comprising fluid pressure brake actuating means and two different sources of pressure, an independent manually operated valve for connection between the source of lower pressure and the brake actuating means, said manual control valve including a first chamber for connection to said lower pressure source, a second chamber for connection to said brake actuating means, there being a regulating diaphragm between said chambers, a first port in said diaphragm for establishing communication between said chambers, a second port in said second chamber opening to the higher pressure source, first and second axially spaced valve members for said first and second ports respectively, said first valve member being adjustably mounted in said second valve member with the adjustment open to atmosphere, spring means tending to seat said valve members, said valve members being adjusted so that said first valve member is normally unseated and the second valve member is normally seated, and operator means associated with said diaphragm positionable for moving said diaphragm toward said first valve member to close said first port thereafter move both valve members to open said second port.

6. For use in fluid pressure operated brake system comprising fluid pressure brake actuating means and a source of vacuum, an independent manually operated valve for connection between said vacuum source and the brake actuating means, said manual control valve including a first chamber for connection to said vacuum source, a second chamber for connection to said brake actuating means, there being a regulating diaphragm between said chambers, a first port in said diaphragm for establishing communication between said chambers, a second port in said second chamber opening to atmosphere, first and second axially spaced valve members for said first and second ports respectively, said first valve member being adjustably mounted in said second valve member with the adjustment open to atmosphere, spring means tending to seat said valve members, said valve members being adjusted so that said first valve member is normally unseated and the second valve member is normally seated, and operator means associated with said diaphragm positionable for moving said diaphragm toward said first valve member to close said first valved port thereafter move both valve members to open said second valve port.

7. For use in fluid pressure operated brake system comprising fluid pressure brake actuating means and two different sources of pressure, an independent manually operated valve for connection between the source of lower pressure and the brake actuating means, said manual control valve including a first chamber for connection to said lower pressure source, a second chamber for connection to said brake actuating means, there being a regulating diaphragm between said chambers, a first port in said diaphragm for establishing communication between said chambers, a second port in said second chamber opening to the higher pressure source, first and second axially spaced valve members for said first and second ports respectively, said first valve member being adjustably mounted by said second valve member with the adjustment open to atmosphere, spring means tending to seat said valve members, said valve members being adjusted so that said first valve member is normally unseated and the second valve member is normally seated, and operator means associated with said diaphragm positionable for moving said diaphragm toward said first valve member to close said first port and thereafter move both valve members to open said second port, said operator means having a diaphragm operating part resiliently coupled to a manually operated part so that when said manually operated part is positioned to close said first port and open the second port the increased fluid pressure in the second chamber may move said diaphragm toward the position wherein said first port is again open, by deforming the resilient coupling between said operator parts.

8. For use in fluid pressure operated brake system comprising fluid pressure brake actuating means and a source of vacuum, an independent manually operated valve for connection between said vacuum source and the brake actuating means, said manual control valve including a first chamber for connection to said vacuum source, a second chamber for connection to said brake actuating means, there being a regulating diaphragm between said chambers, a first port in said diaphragm for establishing communication between said chambers, a second port in said second chamber opening to atmosphere, first and second axially spaced valve members for said first and second ports respectively, said first valve member being adjustably mounted by said second valve member with the adjustment open to atmosphere, spring means tending to seat said valve members, said valve members being adjusted so that said first valve member is normally unseated and the second valve member is normally seated, and operator means associated with said diaphragm positionable for moving said diaphragm toward said first valve member to close said first valved port and thereafter move both valve members to open said second valve port, said operator means having a diaphragm operating part resiliently coupled to a manually operated part so that when said manually operated part is positioned to close said first valved port and open the second port the increased fluid pressure in the second chamber may move said diaphragm toward the position wherein said first valved port is again open, by deforming the resilient coupling between said operator parts.

FRED R. ALLIN.
FREDERIC D. WYSS.

No references cited.